(12) United States Patent
Kismarton et al.

(10) Patent No.: US 11,753,165 B2
(45) Date of Patent: Sep. 12, 2023

(54) MODULAR CARGO HANDLING SYSTEM

(71) Applicant: The Boeing Company, Chicago, IL (US)

(72) Inventors: Max U. Kismarton, Chicago, IL (US); Robert Erik Grip, Chicago, IL (US); Ted K. Rothaupt, Chicago, IL (US)

(73) Assignee: The Boeing Company, Arlington, VA (US)

( * ) Notice: Subject to any disclaimer, the term of this patent is extended or adjusted under 35 U.S.C. 154(b) by 52 days.

(21) Appl. No.: 17/450,491

(22) Filed: Oct. 11, 2021

(65) Prior Publication Data

US 2022/0024590 A1 Jan. 27, 2022

Related U.S. Application Data

(62) Division of application No. 16/182,098, filed on Nov. 6, 2018, now Pat. No. 11,167,849.

(51) Int. Cl.
*B64D 9/00* (2006.01)

(52) U.S. Cl.
CPC ........ *B64D 9/003* (2013.01); *B64D 2009/006* (2013.01)

(58) Field of Classification Search
CPC .............. B64D 9/003; B64D 2009/006; B64D 2011/0046; B64D 2011/0696; B64C 1/20; B64C 1/22; B64C 1/18; B60P 7/13; B60P 7/06; B60N 2/01575; B65G 13/11; Y02T 50/40

See application file for complete search history.

(56) References Cited

U.S. PATENT DOCUMENTS

| | | | | |
|---|---|---|---|---|
| 3,982,639 A * | 9/1976 | Haldimann | ............... | B65G 1/06 414/286 |
| 4,134,345 A * | 1/1979 | Baldwin | ................. | B60P 7/132 410/70 |
| 4,161,301 A * | 7/1979 | Beardsley | ................ | B64D 1/10 89/1.51 |
| 4,234,278 A * | 11/1980 | Harshman | ............. | B65D 88/14 410/79 |
| 4,256,012 A * | 3/1981 | Cowart | .................... | B64D 1/08 89/1.51 |
| 4,349,168 A * | 9/1982 | Barnes | ..................... | B64D 1/10 410/105 |
| 4,860,973 A * | 8/1989 | Fenner | ..................... | B64D 9/00 414/532 |
| 4,875,645 A * | 10/1989 | Courter | .................... | B64D 9/00 414/532 |
| 5,090,639 A * | 2/1992 | Miller | ...................... | B64D 9/00 244/137.1 |
| 5,134,821 A * | 8/1992 | Sadahiro | .................. | E04C 3/40 52/639 |

(Continued)

*Primary Examiner* — Medhat Badawi
(74) *Attorney, Agent, or Firm* — McDonnell Boehnen Hulbert & Berghoff LLP

(57) ABSTRACT

Examples relate to modular cargo handling. An example system for positioning and securing cargo includes a pair of rails extending longitudinally in a parallel configuration. The system includes floor beams coupled between coupling links (e.g., sets of wheels) that removably couple to the pair of rails such that each floor beam can move along the length of the rails with less friction. Each floor beam can include one or more coupling points that can be used to secure units of cargos to the floor beams.

20 Claims, 8 Drawing Sheets

(56) References Cited

U.S. PATENT DOCUMENTS

| | | | | |
|---|---|---|---|---|
| 6,279,309 B1* | 8/2001 | Lawlor | F01D 25/285 | 60/39.35 |
| 6,302,358 B1* | 10/2001 | Emsters | B64D 9/00 | 244/137.1 |
| 6,789,988 B1* | 9/2004 | Moradians | B60P 7/0815 | 410/105 |
| 7,467,783 B2* | 12/2008 | Rawdon | F16G 11/12 | 254/412 |
| 7,506,855 B2* | 3/2009 | Frantz | B64C 1/20 | 244/118.6 |
| 7,534,082 B2* | 5/2009 | Rawdon | B65G 67/20 | 414/679 |
| 7,665,938 B2* | 2/2010 | Schulze | B64D 9/003 | 410/80 |
| 7,891,608 B2* | 2/2011 | Rawdon | B64C 1/22 | 244/119 |
| 8,061,035 B2* | 11/2011 | Stulc | B64C 1/069 | 29/897 |
| 8,226,034 B2* | 7/2012 | Huber | B64C 1/20 | 244/119 |
| 8,286,913 B2* | 10/2012 | Barauke | B64C 1/20 | 244/118.6 |
| 8,342,448 B2* | 1/2013 | Huber | B64C 1/20 | 244/118.1 |
| 8,387,917 B1* | 3/2013 | Grip | B64C 1/08 | 244/119 |
| 8,528,294 B2* | 9/2013 | Vanker | E04B 1/1903 | 52/270 |
| 8,708,282 B2* | 4/2014 | Helou, Jr. | B64C 39/02 | 244/119 |
| 8,979,448 B2* | 3/2015 | Tsakiris | B64C 1/20 | 410/80 |
| 9,376,210 B2* | 6/2016 | Lohmann | B60P 7/0892 | |
| 9,415,871 B1* | 8/2016 | Paul | B64C 1/20 | |
| 9,738,402 B2* | 8/2017 | Brown | B64C 1/20 | |
| 9,802,690 B2* | 10/2017 | Goelet | B64B 1/32 | |
| 9,809,308 B2* | 11/2017 | Aguilar | B61B 13/00 | |
| 10,377,572 B1* | 8/2019 | Meidinger | B64F 1/368 | |
| 10,391,921 B2* | 8/2019 | Kismarton | B60P 7/13 | |
| 10,457,376 B1* | 10/2019 | Koman | B64C 1/20 | |
| 2003/0214143 A1* | 11/2003 | Walker | B65D 90/0026 | 294/81.53 |
| 2004/0018067 A1* | 1/2004 | Taylor | B65D 88/14 | 410/46 |
| 2005/0263030 A1* | 12/2005 | Karpati | B64D 9/00 | 104/88.01 |
| 2006/0108477 A1* | 5/2006 | Helou, Jr. | B64C 1/00 | 244/137.1 |
| 2007/0108347 A1* | 5/2007 | Sankrithi | B64C 1/08 | 244/119 |
| 2007/0181745 A1* | 8/2007 | Huber | B64C 1/068 | 244/118.1 |
| 2008/0105785 A1* | 5/2008 | Griess | B64C 1/068 | 244/119 |
| 2008/0272236 A1* | 11/2008 | Rawdon | B64C 1/22 | 244/119 |
| 2009/0025616 A1* | 1/2009 | Merrill | B65D 88/14 | 264/145 |
| 2009/0166472 A1* | 7/2009 | Kook | B64C 1/18 | 244/129.1 |
| 2009/0236473 A1* | 9/2009 | Rawdon | B64C 1/08 | 244/120 |
| 2009/0252569 A1* | 10/2009 | Walker | B65D 90/0006 | 410/78 |
| 2009/0294588 A1* | 12/2009 | Griess | B64C 1/18 | 244/119 |
| 2010/0096502 A1* | 4/2010 | VanderWolk | B64D 11/0696 | 248/503.1 |
| 2010/0102171 A1* | 4/2010 | Osorio | B64C 1/18 | 29/897 |
| 2010/0108808 A1* | 5/2010 | Allain | B64D 11/0624 | 439/34 |
| 2010/0116932 A1* | 5/2010 | Helou, Jr. | B64C 1/00 | 244/118.1 |
| 2010/0200697 A1* | 8/2010 | Sankrithi | B64C 1/068 | 244/119 |
| 2011/0001006 A1* | 1/2011 | Delahaye | B64F 5/10 | 244/119 |
| 2011/0011978 A1* | 1/2011 | Haack | B64C 1/18 | 244/119 |
| 2013/0007935 A1* | 1/2013 | Chin | F41F 3/04 | 244/33 |
| 2014/0202824 A1* | 7/2014 | Esser | B64D 9/003 | 248/503 |
| 2016/0101933 A1* | 4/2016 | Walker | B65D 90/002 | 410/82 |
| 2016/0348711 A1* | 12/2016 | Benthien | F16B 7/185 | |
| 2017/0101748 A1* | 4/2017 | Thrall | E01D 6/00 | |
| 2017/0130766 A1* | 5/2017 | Benthien | B64C 1/08 | |
| 2018/0022434 A1* | 1/2018 | Grip | B64C 1/08 | 244/118.1 |
| 2018/0273300 A1* | 9/2018 | Weisfelner | B64C 1/20 | |
| 2018/0290724 A1* | 10/2018 | Nowarre | B65G 13/11 | |
| 2018/0305076 A1* | 10/2018 | Lee | B65D 19/0059 | |
| 2019/0308725 A1* | 10/2019 | Sherman | B64D 9/003 | |
| 2019/0329892 A1* | 10/2019 | Roth | B64D 11/0696 | |
| 2019/0337622 A1* | 11/2019 | Dallum | B64D 9/00 | |
| 2019/0382095 A1* | 12/2019 | Junior | B64C 1/20 | |
| 2020/0002003 A1* | 1/2020 | Fuerstenberg | H02G 11/006 | |
| 2020/0031475 A1* | 1/2020 | Gross | B64D 11/0696 | |
| 2020/0094970 A1* | 3/2020 | Galliot | B64C 1/20 | |
| 2020/0140089 A1* | 5/2020 | Kismarton | B64C 1/22 | |
| 2022/0024590 A1* | 1/2022 | Kismarton | B64C 1/22 | |

* cited by examiner

MODULAR CARGO HANDLING SYSTEM

CROSS-REFERENCE TO RELATED APPLICATION

The present patent application is a divisional of U.S. patent application Ser. No. 16/182,098, filed on Nov. 6, 2018, the entire contents of which are hereby incorporated by reference.

FIELD

The present disclosure relates generally to a cargo handling system, and more particularly to a modular cargo handling system for use within the fuselage of an aircraft.

BACKGROUND

A cargo aircraft is a fixed-wing aircraft specifically designed to carry cargo. Cargo aircraft are often designed with a wide and tall fuselage cross-section that maximizes space available for securing and storing cargo. As such, large ramps and cargo loaders are used to load cargo onto and unload cargo from cargo aircraft and other types of aircraft. The large ramps and cargo loaders, however, can be expensive and require time and resources to set up and use.

SUMMARY

In one example, a system for positioning and securing cargo is described. The system includes a first rail and a second rail extending longitudinally in a parallel configuration. The system further includes a first coupling link removably coupled to an inner side of the first rail such that the first coupling link is configured to move along a length of the first rail and a second coupling link removably coupled to an inner side of the second rail such that the second coupling link is configured to move along a length of the second rail. The system includes a floor beam coupled between the first coupling link and the second coupling link. The floor beam includes at least one coupling point configured to secure a unit of cargo to the floor beam.

In another example, a method for positioning and securing cargo is described. The method includes coupling a unit of cargo to a floor beam. The floor beam is coupled between a first coupling link and a second coupling link, and the floor beam includes at least one coupling point configured to secure the unit of cargo to the floor beam. The method also includes coupling the first coupling link to an inner side of a first rail such that the first coupling link is configured to move along a length of the first rail and the second coupling link to an inner side of a second rail such that the second coupling link is configured to move along a length of the second rail. The first rail and the second rail extend longitudinally in a parallel configuration.

In another example, an apparatus is described. The apparatus includes a first rail and a second rail extending longitudinally in a parallel configuration. The apparatus further includes a first coupling link removably coupled to an inner side of the first rail such that the first coupling link is configured to move along a length of the first rail and a second coupling link removably coupled to an inner side of the second rail such that the second coupling link is configured to move along a length of the second rail. The apparatus also includes a floor beam coupled between the first coupling link and the second coupling link. The floor beam includes at least one coupling point configured to secure a unit of cargo to the floor beam.

The features, functions, and advantages that have been discussed can be achieved independently in various examples or may be combined in yet other examples further details of which can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

DETAILED DESCRIPTION

Figure 1:
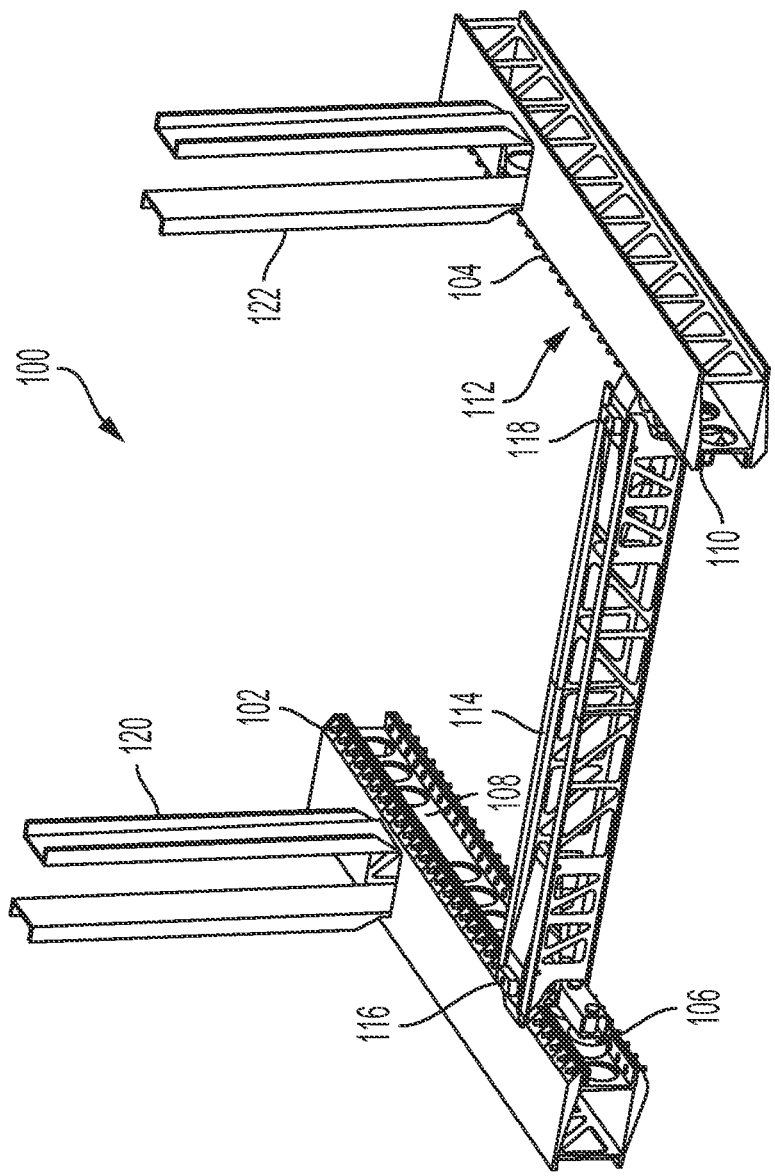
FIG. 1 illustrates a system for positioning and securing cargo, according to an example implementation.

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Ramps and large cargo loaders are often used to load cargo on and unload cargo from a cargo aircraft or another type of vehicle or vessel. For instance, a ramp is positioned near the opening of a vehicle or vessel to enable a loader (e.g., forklift, crane, or person) to load cargo onto and unload cargo from the vehicle or vessel. For larger types of cargo, such as large containers and pallets, cargo loaders can be positioned at a fixed location near a vehicle or vessel and used for loading and unloading cargo. A cargo loader can be configured with two platforms capable of rising and descending independently. This way, cargo can be lifted and moved on a vehicle or vessel.

The various types of ramps, large cargo holders, and other equipment often used for loading and unloading a cargo aircraft and other types of vehicles can be expensive, which limits their overall availability. Particularly, cargo loaders can be so costly that many airports or other locations for loading vehicles do not have them available. In addition, ramps, cargo holders and other equipment are often time intensive to set up and use. With global shipping demands continuing to increase, it is desirable to be able to quickly and efficiently manage transportation of cargo using aircraft and other vehicles to limit the duration that cargo remains in the shipping process.

Example implementations presented herein involve systems, apparatuses, and methods that enable efficient and secure cargo management. Cargo management involves the safe and secure transportation of cargo (e.g., goods, materials, etc.) between locations. The cargo management often involves using one or more vehicles, such as aircraft, vessels, trains, spacecraft, and ground vehicles. The example systems and apparatuses present mechanical structures designed to enable cargo to be transported onto and secured on or within an aircraft (e.g., cargo aircraft), vessel, train, spacecraft, or another type of vehicle in a timely manner. Particularly, the mechanical structures can be used to reduce the force required to move and secure cargo through a design that lifts and guides cargo minimizing the amount of ground-generated friction encountered during cargo management. In addition, some example implementations present methods for utilizing a system or an apparatus to position and secure cargo on or within an aircraft, vessel, train, spacecraft, or another type of vehicle. Other example implementations describe methods for using a system or an apparatus to efficiently unload cargo transported on an aircraft, vessel, train, spacecraft, or another type of vehicle. Further, some examples may involve moving or organizing cargo within a fixed structure, such as a warehouse, factory, or shop.

The different implementations described herein can be used to secure and manage various types of cargo for transportation or storage. Particularly, cargo is used herein to represent various goods or objects that might be transported on one or more vehicles, such as an aircraft, spacecraft, motor vehicle, train, or ship. As such, cargo can have different sizes and configurations within various examples. For instance, some examples can involve transporting cargo in the form of shipping containers or as objects placed upon pallets. As a result, example implementations can involve mechanical structures designed to accommodate cargo units with different sizes and configurations.

To illustrate, an example system is configured with a first rail and a second rail extending longitudinally in a parallel configuration. The rails are arranged in the longitudinal, parallel configuration to serve as a track that can be used to guide the movement of cargo on or off a vehicle. For instance, the first rail and second rail can be constructed in the parallel configuration extending longitudinally within a fuselage of an aircraft to enable cargo to be positioned at different locations within the fuselage. The rails are used within the system to create a track that can lift and move cargo without the need for an underlying floor beneath the system.

To enable each unit of cargo to be moved and secured individually, the system uses physically separate floor beams that are designed to support cargo units. Particularly, each floor beam is coupled in-between a pair coupling links that attach and enable the floor beams to move along the rails. As a result, the floor beams can serve as structures that are able to hold or otherwise secure cargo while the coupling links enable moving and positioning the secured cargo according to the length of the rails. The combination of floor beams and coupling links can lift the cargo units off the ground. This configuration enables moving cargo with less from the ground underneath, which reduces the amount of force required to manage the cargo. In addition, the system can also eliminate the need for a complete floor system within an aircraft. As a result, the aircraft can use the extra weight allowance for transporting additional cargo via flight.

In some examples, the system includes a latching system configured to lock floor beams in fixed positions. Particularly, the latching system can securely lock one or more coupling links of a floor beam to secure the floor beam in a fixed position. When in a fixed position, the floor beam can be prevented from unwanted shifting or movement, such as during transportation of the vehicle (e.g., during flight of the aircraft) or when being used for storage. The latching system can also enable quick unlocking of coupling links to enable efficient movement (e.g., unloading) of the cargo. Particularly, when unlocked, the floor beam can once again be moved along the rails and even removed off the rails during unloading the cargo. For instance, cargo units can be transported on the floor beams configured with coupling links between multiple vehicles, which can involve the use of multiple rail systems that are physically separate. The cargo can be also taken off the floor beam while the floor beam is on or off the rail system.

Additional platforms or beams can optionally be used to further secure and position cargo. For instance, a platform can be used to connect two or more floor beams together. The platform can be used to securely hold cargo with a weight of the cargo distributed across the two or more floor beams coupled together by the platform.

Some example implementations present methods for positioning and securing cargo. An example method involves initially coupling a unit of cargo to a floor beam. Particularly, the floor beam is configured to support the unit of cargo to the floor beam. As such, a unit of cargo is secured to the floor beam for further positioning within a vehicle. The floor beam can include one or more coupling points that are configured to engage and secure the unit of cargo on the floor beam. For instance, a coupling point can include an extension (e.g., a raised portion) that extends into the base of the cargo and a twist pin configured to lock the cargo to the floor beam. Other types of coupling points can be used, such as extended structures, straps, etc.

The example method further involves coupling the coupling links of the floor beam to a rail system to enable movement of the floor beam carrying the unit of cargo along the rails. For example, the floor beam may be coupled in-between two coupling links (e.g., wheels) designed to move along the rails when coupled to the rails. As such, the coupling links can be coupled such that a first coupling link on one side of the floor beam is positioned to move along a length of the first rail and a second coupling link on the opposite side of the floor beam is positioned to move along a length of the second rail. This way, the floor beam can move along the track formed by the first rail and the second rail to enable cargo to be positioned and secured using less force due to less friction. In other examples, the coupling links can enable movement of the floor beam in other ways (e.g., gliding along the rails).

In some examples, coupling links configured to move along a set of rails are connected directly to the bottom of a cargo unit. For instance, a cargo unit can have four coupling links positioned to the base of the cargo unit at four positions. As such, the cargo unit can be moved along the set of rails via the four coupling links without requiring the use of a floor beam.

Referring now to the Figures, FIG. 1 illustrates a system for positioning and securing cargo, according to an example implementation. The system 100 includes a first rail 102, a second rail 104, a first coupling link 106, a second coupling link 110, and a floor beam 114. In other examples, the system 100 may include more or fewer components in different arrangements. Additional configurations are described below.

The system 100 represents a mechanical structure capable of positioning and securing cargo. As such, the system 100 can be used to position and secure cargo within a cargo aircraft or another type of aircraft. In some examples, the system 100 can be constructed as a fixed part of the aircraft, such as part of the fuselage of a cargo aircraft. In other examples, the system 100 is temporarily installed inside an aircraft enabling the system 100 to be removed. The system 100 can also be used to position and secure cargo on or within another type of vehicle (e.g., a train, ship, truck, or spacecraft). In addition, the system 100 can also be used to position and secure cargo within a fixed structure, such as a warehouse, storage unit, or shop.

The system 100 enables efficient and secure movement and storage of cargo. In some instances, the system 100 can be used to efficiently load and organize units of cargo within the fuselage of an aircraft. Cargo units can be moved on to the aircraft and then locked in a fixed position that helps reduce unwanted movement during flight of the aircraft. Similarly, the system 100 can also be used to efficiently load and organize units of cargo on or within the structures of other types of vehicles (e.g., a train, ship, truck, or spacecraft) or within fixed structures (e.g., warehouse, storage unit, or shop).

The system 100 can enable efficient cargo management partly by reducing the amount of force needed to move units of cargo. Particularly, the system 100 includes rails that can be used to move and position each unit of cargo off the ground reducing the amount of ground-generated friction experienced while moving the cargo. As a result, each unit of cargo can be moved and secured as desired using less force, which might reduce the number of people and vehicles required to load or unload the cargo.

In addition to loading cargo onto an aircraft or another type of vehicle, the system 100 can also be used to efficiently unload units of cargo. In particular, the system 100 can enable locked units of cargo to be quickly unlocked and unloaded. In some examples, the system 100 can enable units of cargo to be moved directly from the system 100 onto another type of vehicle for further shipping. For instance, the system 100 can be used to transfer units of cargo from a cargo aircraft onto a truck or another type of vehicle. The various cargo units can remain on the floor beams (and corresponding coupling links (e.g., wheels) on the end of the floor beams) and moved in-between vehicles. The cargo units can be transferred from the system 100 onto a second system configured with a rail system. The second system can be positioned on a vehicle or at a fixed structure. By using the system 100, it is possible to use less resources and time to securely manage cargo, such during transportation of the cargo or storage and organization of the cargo.

Within the system 100, the first rail 102 and the second rail 104 are shown extending longitudinally in a parallel configuration. By extending in a fixed, parallel configuration, the floor beam 114 as well as other floor beams or structures may be positioned in-between (or otherwise connected to) the rails. When coupled to the rails, the floor beam 114 can move longitudinally along the rails without extending or shortening in length.

The parallel configuration aligns the first rail 102 and the second rail 104 as tracks for controllably guiding cargo positioned on floor beams along the rails. The tracks formed by the first rail 102 and the second rail 104 can support the weight of cargo and lift each unit off the ground below. This way, a moving force (e.g., a vehicle or one or more people) can move cargo along the track created by the first rail 102 and the second rail 104 with part of the weight of the cargo offset by the rail system. The rails reduce the amount of friction working against moving the cargo. The first rail 102 and the second rail 104 can lift and position units of cargo to move substantially without friction from the ground such that less force is required to move the units into desired positions. As a result, fewer resources might be used to securely move and position cargo for transportation or storage.

In some examples, the first rail 102 and the second rail 104 may extend longitudinally in the parallel configuration within the fuselage of an aircraft. For example, the first rail 102 and the second rail 104 may be coupled to a surface of a first longeron and a surface of a second longeron within the fuselage of the aircraft, respectively. A longeron is a longitudinal structural component of an aircraft's fuselage. The longerons can serve as load-bearing components of the framework of the aircraft or another type of vehicle. An aircraft or another type of vehicle can also include vertical structural components that can be used to secure the system 100. A vertical structural component can be referred to as a frame or a column. A first column 120, a second column 122, and/or other longerons, frames, and/or columns can be used to securely position the first rail 102 and the second rail 104 at a position (e.g., above the ground) to enable heavy units of cargo to be moved on floor beams with less or even no friction from a floor. Structural beams and other components of a vehicle can also be used to install and position the system 100.

With the first rail 102 and the second rail 104 extending longitudinally inside the fuselage, cargo may be moved inside and positioned at different locations within the fuselage, including in a back portion of the aircraft positioned opposite the opening used for loading. The first rail 102 and the second rail 104 can also make organization of cargo more uniform with less effort. The rails set up a fixed path for moving units of cargo preventing cargo from undesired shifting during storage and transport. In addition, the rails can also carry the compression loads or tension that might occur in the lower half of the fuselage during landings or other flight maneuvers (e.g., positive or negative gravity maneuvers).

In other examples, the first rail 102 and the second rail 104 may extend inside or on another type of vehicle. For instance, the rails can extend within or along a train car, ship, spaceship, or truck. In additional implementations, the first rail 102 and the second rail 104 can extend longitudinally within a building or another structure.

The first rail 102 and the second rail 104 may extend parallel without an increase or decrease in slope. As a result, the floor beam 114 may be moved evenly along the rails without requiring more or less force at any point. In other examples, the first rail 102 and the second rail 104 may extend in the parallel configuration such that one end of the rails is positioned above or below the other end creating a slope in the rails alignment. The slope can enable the loading or unloading process to require less force than the opposite process. For instance, when the rails are positioned with the inner most ends on the aircraft or other type of vehicle positioned lower than the other ends of the rails, the downward slope can cause the force required while loading the cargo to be less than the force required to unload the cargo.

Within the system 100, the floor beam 114 is configured to move in between the rails. The floor beam 114 can be removably coupled to the first rail 102 and the second rail 104 via a pair of coupling links (i.e., a first coupling link 106 and a second coupling link 110). A coupling link is a structure that enables movement of a floor beam (e.g., the floor beam 114) along a rail. The first coupling link 106 in the system 100 is shown in FIG. 1 as a first set of wheels and the second coupling link 110 is shown as a second set of wheels. The first coupling link 106 and the second coupling link 110 are included to enable motion of the floor beam 114 along the first rail 102 and the second rail 104. Particularly, similar to train tracks or another form of rail system, the first coupling link 106 and the second coupling link 110 can couple to and move along the rails.

The first coupling link 106 and the second coupling link 110 are used to reduce friction that may arise between floor beams carrying cargo and the rails. In the example shown in FIG. 1, the first coupling link 106 and the second coupling link 110 are shown as sets of wheels that can reduce the amount of friction generated between the coupling links and the rails as the floor beam 114 is moved along the rail system. One or more wheels within each set of wheels making up the first coupling link 106 and the second coupling link 110 align within a track formed by each rail. In other examples, one or more wheels within each set may couple on top of each rail. The wheels can connect to the rails in other ways within examples.

In the example illustrated in FIG. 1, the first coupling link 106 is shown removably coupled to an inner side 108 of the first rail 102. Removably coupled indicates that the first coupling link 106 can be coupled to move along the first rail 102 and can also be removed from the first rail 102 altogether. By having the ability to remove the first coupling link 106 from the first rail 102, a cargo unit can be coupled to the floor beam 114 prior to positioning the floor beam 104 onto the rail system. The floor beam 104 can be moved between different rail systems and also moved independently without a rail system. For instance, a unit of cargo might be secured to the floor beam 114 prior to engaging the first coupling link 106 to the first rail 102. Once coupled to the first rail 102, the first coupling link 106 can move according to a tract formed by the first rail 102 that guides the coupling link 106 along a fixed axis of movement (i.e., the length of the first rail 102). When coupled to the first rail 102, the first coupling link 106 can move along a length of the first rail 102.

The first coupling link 106 is shown in an example configuration that includes a block equipped with four wheels positioned on one side of the block. In particular, each wheel is coupled to an axle that extends through the block. The axle enables the corresponding wheel to rotate along a tract created by the first rail 102. In addition, the four wheels part of the first coupling link 106 is shown arranged such that a weight of the floor beam 114 is distributed evenly across the wheels. In other examples, the first coupling link 106 may include one, two, three, or another quantity of wheels positioned in another arrangement.

The second coupling link 110 is shown removably coupled to an inner side 112 of the second rail 104. When coupled to the second rail 104, the second coupling link 110 can move along a length of the second rail 104. In particular, the combination of the first coupling link 106 and the second coupling link 110 can move in sync along the first rail 102 and the second rail 104 enabling movement of the floor beam 114. This way, the floor beam 114 can move smoothly along an axis formed by the parallel configuration of the first rail 102 and the second rail 104 making it easier to organize multiple cargo units on or within a vehicle equipped with the system 100.

As shown in FIG. 1, the second coupling link 110 includes a configuration similar to the first coupling link 106. Particularly, the second coupling link 110 includes four wheels arranged such that a weight carried by the floor beam 114 is distributed evenly across the wheels. In other examples, the second coupling link 110 may include one, two, three, or another quantity of wheels.

In other examples, other types of coupling links are used to couple the floor beam 114 to the first rail 102 and the second rail 104. For instance, when the rail has a horizontal pole structure, a coupling link can have a structure that positions around or partially around the pole such that the coupling link can glide along the pole. In another example, the rail and coupling link can form a magnetic subsystem that uses sets of magnets to repel and push a floor beam up off the rail (i.e., levitation) and other sets of magnets to enable movement of the floor beam. Other examples of coupling links are possible.

In further examples, a combination of different types of coupling links can be used to secure the floor beam 114 to the first rail 102 and the second rail 104. The combination of different types of coupling links can be used to enable switching between rail systems that are configured for different coupling links.

The system 100 is shown with a floor beam 114 coupled between the first coupling link 106 and the second coupling link 110. The floor beam 114 represents a structure configured to hold a unit of cargo or other types of objects. By coupling to the first coupling link 106 and the second coupling link 110, the floor beam 114 is able to move along the first rail 102 and the second rail 104. In some examples, the floor beam 114 is configured with coupling links (e.g., sets of wheels) as a single-piece structure.

In addition, the floor beam 114 serves as a connecting structure that connects the first coupling link 106 and the second coupling link 110. This way, the floor beam 114 can cause the first coupling link 106 and the second coupling link 110 to move uniformly along the first rail 102 and the second rail 104, respectively.

The size, material, and structure of the floor beam 114 may differ within example implementations. For instance, the floor beam 114 can be constructed out of strong, lightweight materials to limit the overall weight of the system 100. The length of the floor beam 114 depends on the distance between the first rail 102 and the second rail 104. The width and height of the floor beam 114 may vary. The width and height can depend on the types of cargo that the floor beam 114 is configured to support. In some examples, the weight and configuration of the floor beam 114 can depend on the weight of the cargo unit placed upon the floor beam 114. Particularly, a heavy cargo unit might be positioned and secured using a heavier floor beam compared the lighter floor beam used to position a lighter cargo unit.

As further shown in FIG. 1, the floor beam 114 includes a first coupling point 116 and a second coupling point 118. Each coupling point represents a structure configured to engage and secure a unit of cargo to the floor beam 114. In the example configuration of system 100 shown in FIG. 1, the first coupling point 116 and the second coupling point 118 have vertical orientations configured to engage the base of a cargo unit. Particularly, each coupling point 116 can engage and potentially extend into slots in the base of a unit of cargo.

In other examples, coupling points can have other configurations, such as straps or fasteners, etc. In further examples, the floor beam 114 can engage a unit of cargo in another orientation. For instance, each cargo unit might couple and hang from the floor beam 114 while the floor beam 114 moves along a set of rails positioned a threshold height above the floor of the vehicle (e.g., the floor of the fuselage). With this configuration, the floor beam 114 can serve as a hanger that holds cargo off the ground.

The system 100 can include other components that can assist with positioning and securing cargo (not shown in FIG. 1). For example, the system 100 can include a latching system configured to lock the floor beam 114 and other floor beams in fixed positions. The latching system can reduce movement of the cargo during flight or operation of the vehicle transporting the cargo. The latching system can also secure cargo in storage.

Figure 2:
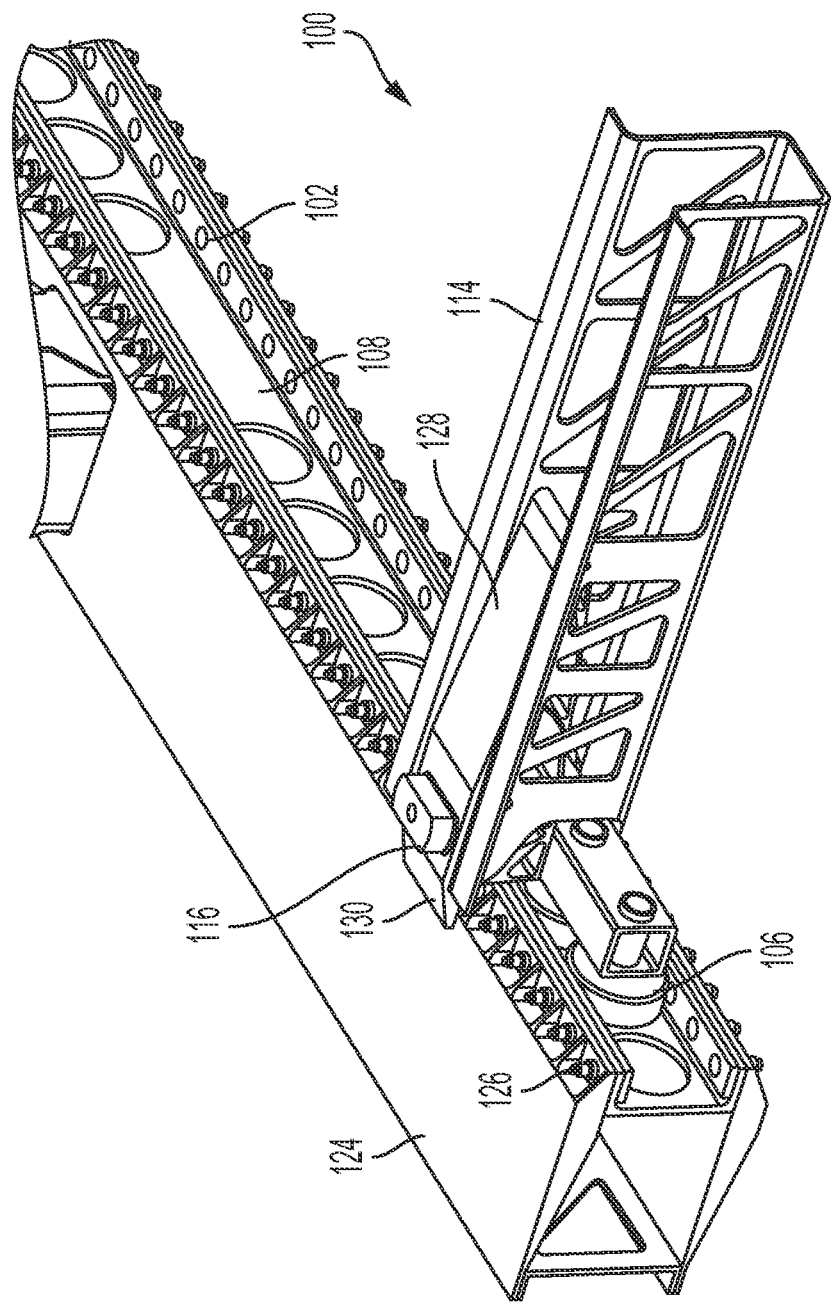
FIG. 2 is an illustration of the system, according to an example implementation.

FIG. 2 is another illustration of the system, according to an example implementation. The partial illustration of the system 100 shown in FIG. 2 shows a detailed view of the alignment between the floor beam 114 and the first rail 102. Particularly, the first coupling link 106 is shown in an aligned position with respect to the first rail 102. In the aligned position, the floor beam 114 can move along the length of the first rail 102 using the first coupling link 106 and the second coupling link 110 (not shown). In other examples, the floor beam 114 can be connected to the first rail 102 in other ways.

As shown in FIG. 2, the first rail 102 is removably coupled to a structural beam 124 via fasteners 126. The structural beam 124 can be part of a vehicle selected to transport cargo. In some examples, the structural beam 124 is part of the fuselage of an aircraft. In other examples, the structural beam 124 is part of the interior of other types of vehicles (e.g., a train). The fasteners 126 used to couple the first rail 102 to the structural beam 124 are screws and bolts. Other types of fasteners can be used, such as adhesives or anchors.

The floor beam 114 is shown with a support 128. The support 128 includes the coupling point 116 for engaging the bottom of a cargo unit. The support 128 can couple to the structure of the floor beam 114. The support 128 can be included to provide a coupling point 116 or another configuration to a generic beam used as the floor beam 114.

In other examples, the floor beam 114 can have another configuration that may or may not include the support 128. The floor beam 114 may not include the support 128 to reduce weight or to reduce the complexity of installing and using the floor beam 114. Particularly, other example configurations for floor beams can include one or more coupling points positioned on the structure of the floor beam. In additional examples, the floor beam 114 does not include the coupling point 116.

As shown in FIG. 2, the support 128 can include an extension 130 that overlaps a portion of the structural beam 124 supporting the first rail 102. The extension 130 could help align the first coupling link 106 and the floor beam 114 when the first coupling link 106 is initially coupled to the first rail 102. The extension 130 can also align the floor beam 114 during movement of the floor beam 114 along the first rail 102. In some examples, the extension 130 can serve as a fail-safe that secures the floor beam to the structural beam 124 in a situation where the first coupling link 106 slip off the first rail 102. In other examples, the support 128 does not include the extension 130.

Figure 3:
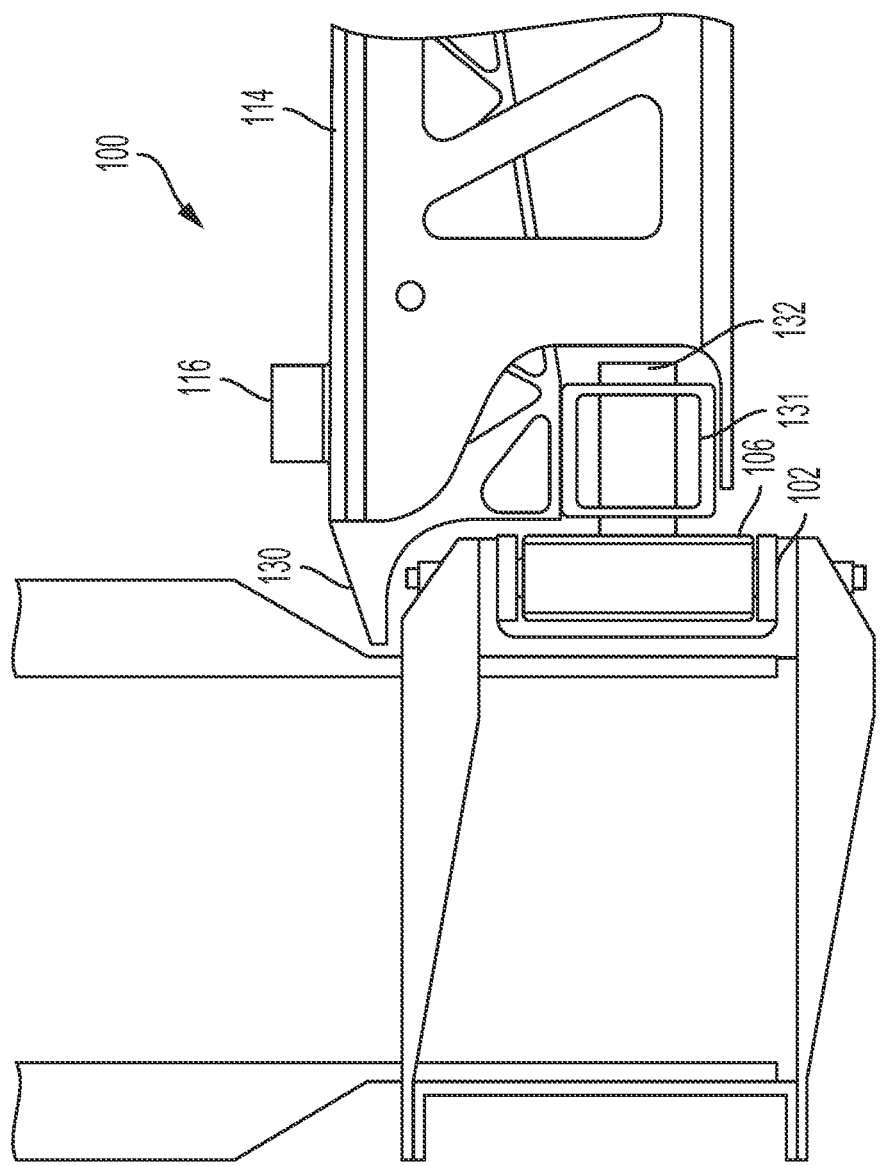
FIG. 3 is yet another illustration of the system, according to an example implementation.

FIG. 3 is yet another illustration of the system, according to an example implementation. The side view of the system 100 illustrated in FIG. 3 shows the floor beam 114 coupled to the first coupling link 106. As shown, the floor beam 114 is coupled to the block 131 of the first coupling link 106.

As shown in FIG. 3, the first coupling link 106 can include wheels that align tightly in the first rail 102. The tight alignment can prevent unwanted movement in between the wheels of the first coupling link 106 and the first rail 102. Each wheel is shown coupled to the block 131 via an axle (e.g., the axle 132). Particularly, the axle 132 enables rotation of a corresponding wheel along the first rail 102. In other examples, the wheels can couple in other ways to the first rail 102.

Figure 4:
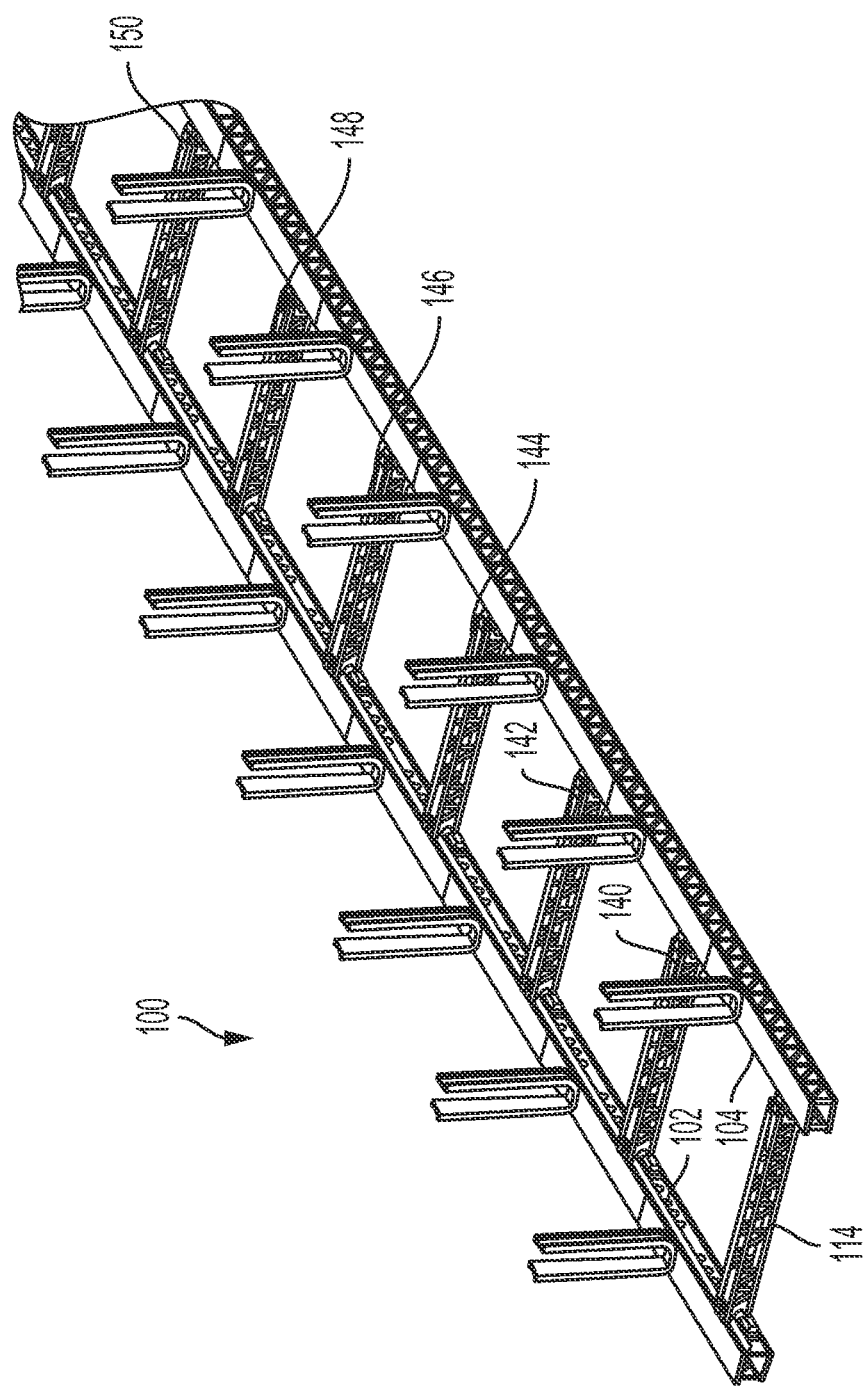
FIG. 4 illustrates the system configured with multiple floor beams, according to an example implementation.

FIG. 4 illustrates the system configured with multiple floor beams, according to an example implementation. The system 100 is shown in an expanded configuration with multiple floor beams extending between the first rail 102 and the second rail 104. Particularly, the system 100 includes the floor beam 114, a second floor beam 140, a third floor beam 142, a fourth floor beam 144, a fifth floor beam 146, a sixth floor beam 148, and a seventh floor beam 150. In other examples, the system 100 can include more or fewer floor beams.

In some examples, the system 100 is configured with multiple floor beams extending in between the first rail 102 and the second rail 104 to enable positioning and securing multiple units of cargo or other objects. For instance, the floor beam 114 and the second floor beam 140 can be used to secure and position a first unit of cargo while the third floor beam 142 and the fourth floor beam 144 are similarly used to secure and position a second unit of cargo. As an example, a cargo unit that extends 10 feet in length can involve using two floor beams that are spaced approximately 10 feet apart to secure and position the cargo unit. Similarly, a cargo unit that extends 40 feet in length can involve using two floor beams that are spaced approximately 40 feet apart to secure and position the cargo unit. Other layouts are possible.

In some examples, two or more floor beams can be used to help balance, position, and secure units of cargo and objects. The quantity of floor beams used within the system 100 to secure a unit of cargo or object can depend on the size or configuration of the unit of cargo or object. For example, a series of floor beams can be used for longer objects. In some examples, units of cargo can be configured with wheels. As such, a floor beam can be used to secure a portion of the unit of cargo in addition to the support provided by the wheels on the cargo. The use of floor beams and a rail system can provide a light-weight structure that can be used to position and move cargo units.

Figure 5:
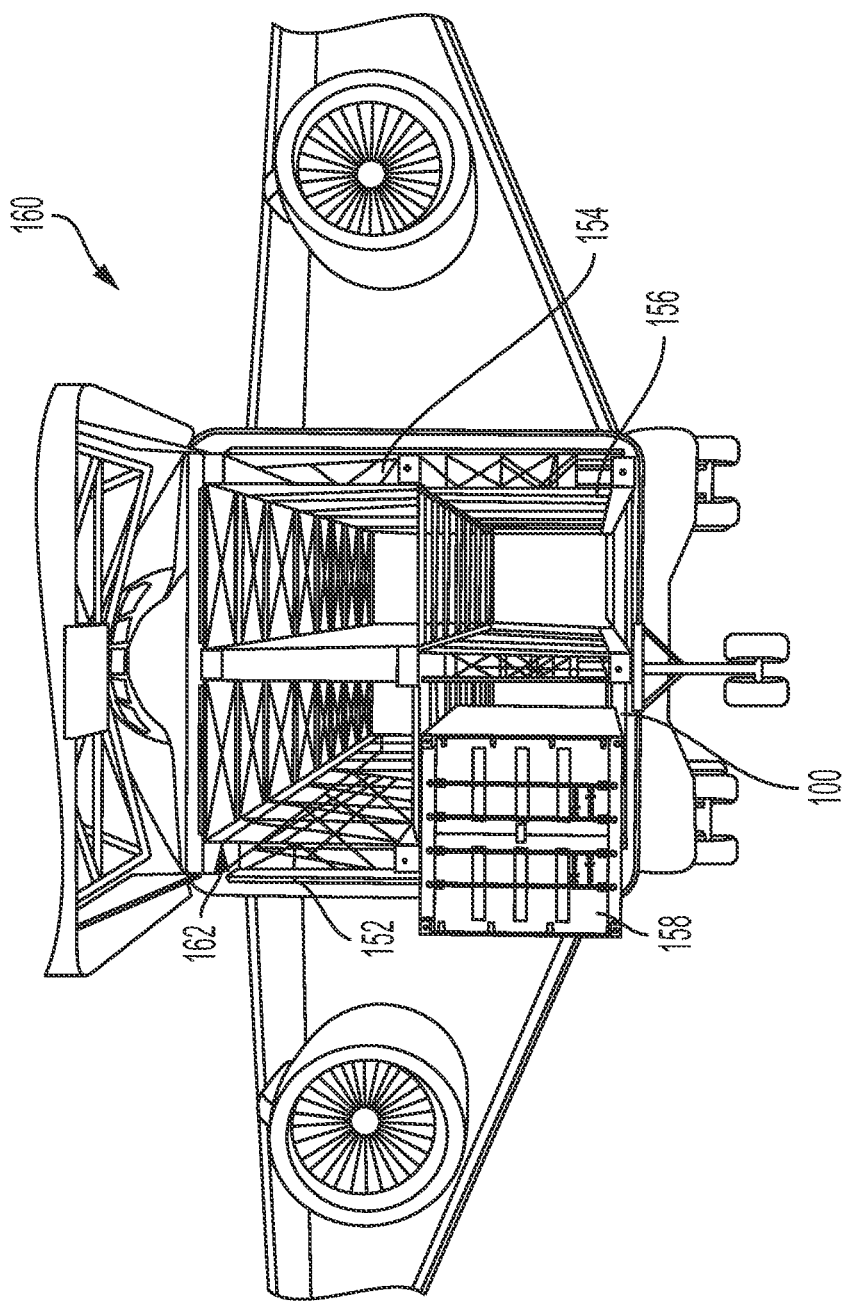
FIG. 5 illustrates the system positioned in the fuselage of an aircraft, according to an example implementation.

FIG. 5 illustrates the system positioned in the fuselage of an aircraft, according to an example implementation. The system 100 is shown positioned within the fuselage 162 of the aircraft 160. In addition, the fuselage 162 also includes additional systems positioned in other quadrants of the fuselage 162. Particularly, the fuselage 162 includes the system 100 positioned in a lower left quadrant, a second system 152 positioned in the upper left quadrant, a third system 154 positioned in the upper right quadrant, and a fourth system 156 positioned in the lower right quadrant. In some examples, each system resembles the configuration of the system 100 with two rails and floor beams capable of coupling to and moving along two rails within each system.

Aircraft 160 is shown configured with multiple systems to illustrate an example arrangement that can increase the capacity of the fuselage 162. Particularly, the multiple levels of systems enable cargo units to be positioned in a two by two rectangular configuration. In other examples, an aircraft can include more or fewer systems. For instance, a smaller aircraft might only include a single system to manage cargo.

In some examples, two or more systems within the fuselage 162 can share a rail designed to enable multiple coupling links to use sides of the rail. For example, the fourth system 156 positioned in the lower right quadrant can be configured to share the second rail 104 used by the first system 100. Particularly, floor beams that align into the fourth system 156 can removably couple to a second, opposite side of the second rail 104 that is not used by floor beams coupling in the system 100. In other examples, each system can include independent rails that are not used by other systems within the fuselage 162 of the aircraft 160.

Figure 6:
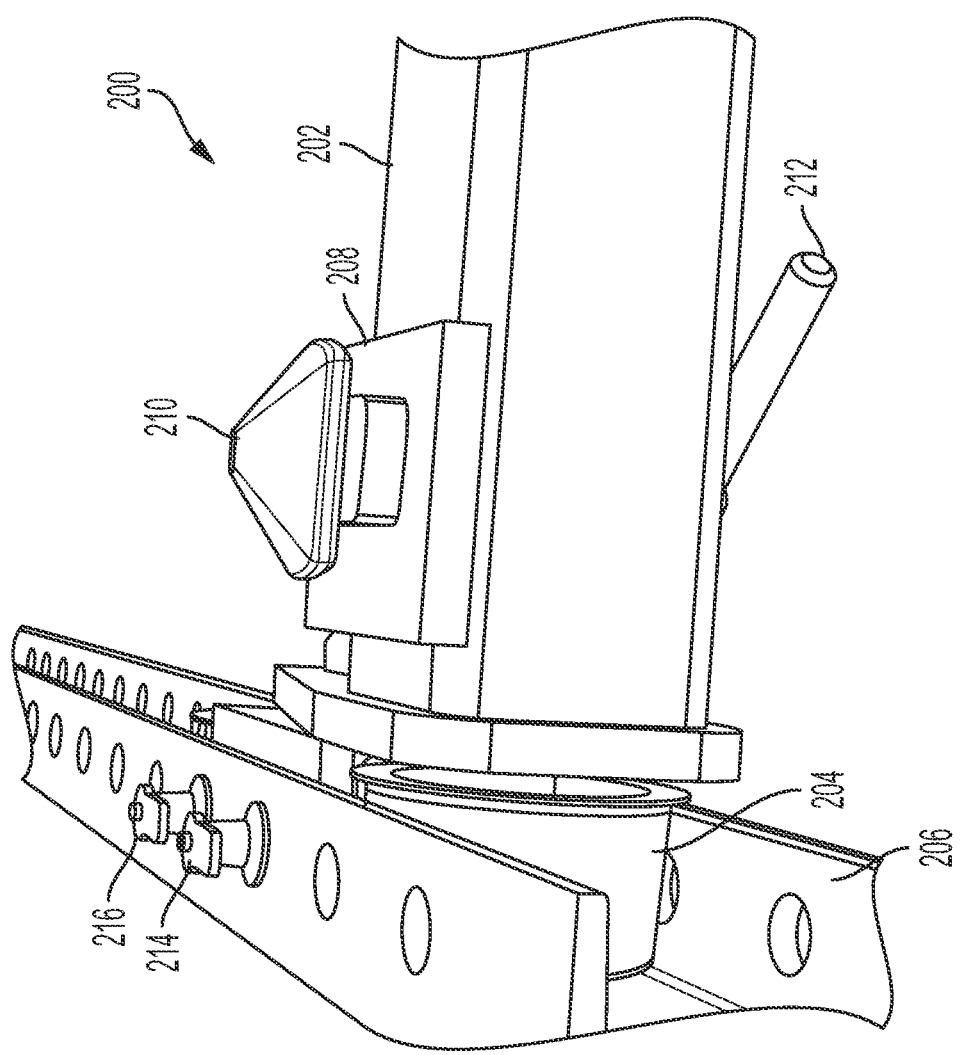
FIG. 6 is an illustration of an apparatus, according to an example implementation.

FIG. 6 is an illustration of an apparatus, according to an example implementation. The apparatus 200 is an example of the system 100 shown in FIGS. 1-5, in an alternative configuration. As such, the apparatus 200 includes floor beam 202 coupled to a rail 206 via coupling link 204. The floor beam 202 further includes a coupling point 208 configured with a twist pin 210.

As shown in FIG. 6, the floor beam 202 can configured with one or more twist pins (e.g., the twist pin 210) to secure a unit of cargo to the floor beam. Particularly, the floor beam 202 is shown configured with the twist pin 210 that can be used to lock a unit of cargo to the floor beam 202. The top of the twist pin 210 turns and locks into a slot in the bottom of cargo in response to a user or system turning the handle 212 of the twist pin 210. To unsecure the unit cargo to release the unit from the floor beam, the handle 212 of the twist pin 210 is rotated back into the unlocked position.

In addition, FIG. 6 also illustrates an example latching system consisting of a first latch 214 and a second latch 216 configured to lock the floor beam 202 in a fixed position. The first latch 214 and the second latch 216 can extend into slots in a top portion of the rail such that the coupling link is in a fixed position (i.e., unable to move). The first latch 214 may be used alone without the second latch 216 inserted and the locking function is not changed. Alternatively, more latches may be used in addition to first latch 214 and second latch 216 and the locking function may not be changed. The latching system can be used to secure cargo coupled to the floor beam 202 using the twist pin 210 in a fixed position, such as during transport or times when movement of the coupling link is undesired.

Figures 7, 8:
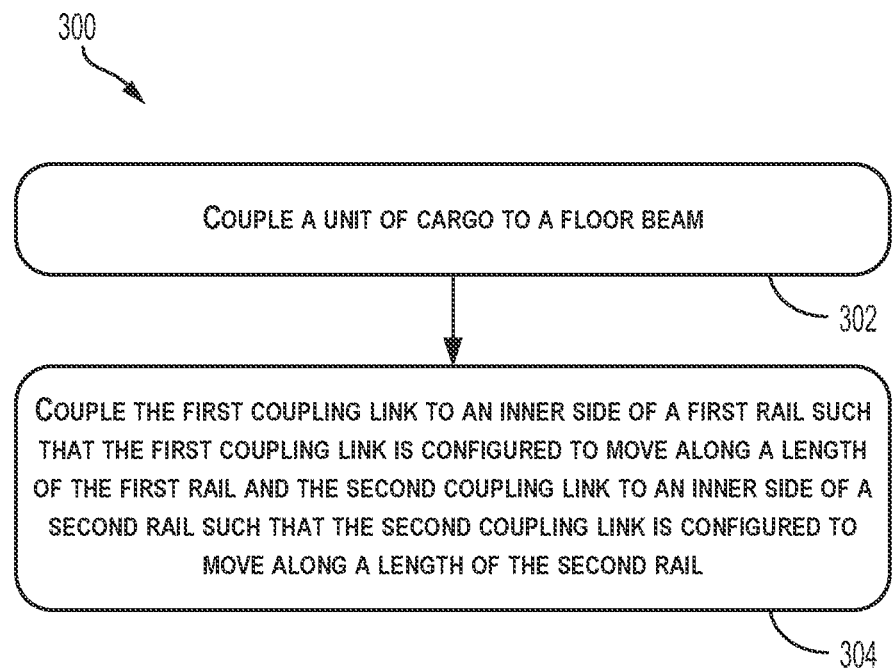
FIG. 7 shows a flowchart of a method, according to an example implementation.
FIG. 8 shows a flowchart of another method for use with the method shown in FIG. 7, according to an example implementation.

FIG. 7 shows a flowchart for a method, according to an example implementation. Method 300 presents an example method that could be used with the system 100 shown in FIGS. 1-5 or the apparatus 200 shown in FIG. 6. In other examples, components of the devices and/or systems may be arranged to be adapted to, capable of, or suited for performing the functions, when operated in a specific manner.

Method 300 can include one or more operations, functions, or actions as illustrated by one or more of blocks 302 and 304. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

At block 302, the method 300 involves coupling a unit of cargo to a floor beam. The floor beam is configured to serve as a platform to support the unit of cargo. The floor beam can be coupled between a first coupling link and a second coupling link similar to the configuration of the system 100 shown in FIG. 1. In addition, the floor beam can be coupled between a first coupling link and a second coupling link similar to the configuration of the apparatus 200 shown in FIG. 6.

For some types of cargo, coupling the unit of cargo to the floor beam involves coupling the unit of cargo to the floor beam and a second floor beam such that the floor beam and the second floor beam balance a weight of the unit of cargo. For other types of cargo, coupling the unit of cargo to the floor beam can involve using a single floor beam or more than two floor beams.

At block 304, the method 300 involves coupling the first coupling link to an inner side of a first rail such that the first coupling link is configured to move along a length of the first rail and the second coupling link to an inner side of a second rail such that the second coupling link is configured to move along a length of the second rail. The first rail and the second rail extend longitudinally in a parallel configuration. In some examples, a vehicle can be used to position the floor beam within the fuselage of the aircraft such that the first coupling link align proximate the inner surface of the first rail and the second coupling link align proximate the inner surface of the second rail.

When the floor beam is coupled between coupling links instead of wheels, the method 300 involves coupling a first coupling link to the first rail and a second coupling link to the second rail such that the first coupling link and the second coupling link are able to move along a length of the rails.

FIG. 8 shows a flowchart of an example method for use with the method 300, according to an example. Block 306 involves positioning the floor beam and the second floor beam in a locked position relative to the first rail and the second rail using a latching assembly. The latching assembly can include one or more latches configured to lock the coupling links (e.g., wheels) coupling the floor beams to the rails in fixed positions.

Figure 9:
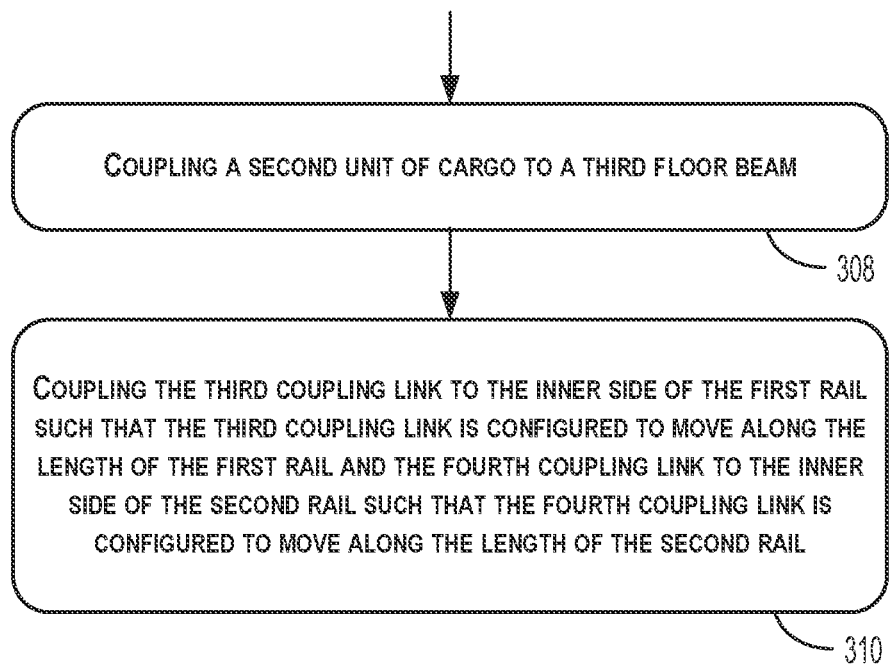
FIG. 9 shows a flowchart of another method for use with the method shown in FIG. 7, according to an example implementation.

FIG. 9 shows a flowchart of an example method for use with the method 300, according to an example. Block 308 involves coupling a second unit of cargo to a third floor beam. The third floor beam is coupled between a third coupling link and a fourth coupling link. Similar to other floor beams, the third floor beam can include at least one coupling point configured to secure the second unit of cargo to the third floor beam.

The second unit of cargo can be also coupled to one or more other floor beams. For instance, a fourth floor beam can be used to distribute weight of the second unit of cargo across both the third floor beam and the fourth floor beam.

Block 310 involves coupling the third coupling link to the inner side of the first rail such that the third coupling link is configured to move along the length of the first rail and the fourth coupling link to the inner side of the second rail such that the fourth coupling link is configured to move along the length of the second rail. Particularly, coupling the wheels attached to the third floor beam can position the second unit of cargo to the rail system created between the first and second rails. The second unit of cargo can then be stored in a position, such as a position next to the other unit of cargo.

By the term "substantially" or "about" used herein, it is meant that the recited characteristic, parameter, or value need not be achieved exactly, but that deviations or variations, including for example, measurement error, measurement accuracy limitations, friction, and other factors known to skill in the art, may occur in amounts that do not preclude and/or occlude the effect the characteristic was intended to provide.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A method for positioning and securing cargo, the method comprising:
   coupling a unit of cargo to a floor beam, wherein the floor beam is coupled between a first coupling link and a second coupling link, and wherein the floor beam includes at least one coupling point configured to secure the unit of cargo to the floor beam; and
   coupling the first coupling link to an inner side of a first rail such that the first coupling link is configured to move along a length of the first rail and the second coupling link to an inner side of a second rail such that the second coupling link is configured to move along a length of the second rail, wherein the first rail and the second rail extend longitudinally in a parallel configuration.

2. The method for positioning and securing cargo of claim 1, wherein coupling the unit of cargo to the floor beam comprises:
   coupling the unit of cargo to the floor beam and a second floor beam such that the floor beam and the second floor beam balance a weight of the unit of cargo.

3. The method for positioning and securing cargo of claim 2, further comprising:
   positioning the floor beam and the second floor beam in a locked position relative to the first rail and the second rail using a latching assembly.

4. The method for positioning and securing cargo of claim 3, wherein positioning the floor beam and the second floor beam in the locked position relative to the first rail and the second rail using the latching assembly comprises:
   extending a set of locks into a plurality of slots in a top portion of the first rail such that the first coupling link is in a locked position.

5. The method for positioning and securing cargo of claim 1, wherein coupling the first coupling link to the inner side of the first rail such that the first coupling link is configured to move along the length of the first rail and the second coupling link to the inner side of the second rail such that the second coupling link is configured to move along the length of the second rail comprises:
   positioning, using a vehicle, the floor beam within a fuselage of an aircraft such that the first coupling link is aligned proximate the inner surface of the first rail and the second coupling link is aligned proximate the inner surface of the second rail.

6. The method for positioning and securing cargo of claim 1, further comprising:
   coupling a second unit of cargo to a third floor beam, wherein the third floor beam is coupled between a third coupling link and a fourth coupling link, and wherein the third floor beam includes at least one coupling point configured to secure the second unit of cargo to the third floor beam; and
   coupling the third coupling link to the inner side of the first rail such that the third coupling link is configured to move along the length of the first rail and the fourth coupling link to the inner side of the second rail such that the fourth coupling link is configured to move along the length of the second rail.

7. The method for positioning and securing cargo of claim 1, wherein coupling the first coupling link to the inner side of the first rail such that the first coupling link is configured to move along the length of the first rail and the second coupling link to the inner side of the second rail such that the second coupling link is configured to move along the length of the second rail comprises:
   coupling a first plurality of wheels on the first coupling link to the inner side of the first rail; and
   coupling a second plurality of wheels on the second coupling link to the inner side of the second rail.

8. The method for positioning and securing cargo of claim 7, wherein the first coupling link comprises:
   a block, wherein the first plurality of wheels are positioned on a first side of the block, wherein each wheel is coupled to an axle that extends through the block, and wherein the first plurality of wheels are positioned such that a weight of the floor beam is distributed across the first plurality of wheels.

9. The method for positioning and securing cargo of claim 8, further comprising:
   coupling the floor beam to the block.

10. The method for positioning and securing cargo of claim 1, wherein coupling the unit of cargo to the floor beam comprises:
    securing the unit of cargo to the floor beam via the at least one coupling point.

11. The method for positioning and securing cargo of claim 10, wherein securing the unit of cargo to the floor beam via the at least one coupling point comprises:
    inserting a twist pin into a slot on the at least one coupling point; and
    locking the twist pin in the slot to secure the unit of cargo to the floor beam.

12. The method for positioning and securing cargo of claim 1, further comprising:
    coupling the unit of cargo to a second floor beam, wherein the second floor beam is coupled between a third coupling link and a fourth coupling link, and wherein the second floor beam includes at least one coupling point configured to secure the unit of cargo to the second floor beam.

13. The method for positioning and securing cargo of claim 12, further comprises:
    coupling the third coupling link to the inner side of the first rail such that the third coupling link is configured to move along the length of the first rail and the fourth coupling link to the inner side of the second rail such that the fourth coupling link is configured to move along the length of the second rail.

14. The method for positioning and securing cargo of claim 1, wherein coupling the first coupling link to the inner side of the first rail such that the first coupling link and the second coupling link to the inner side of the second rail comprises:
    coupling the first coupling link and the second coupling link via a magnetic subsystem.

15. The method for positioning and securing cargo of claim 1, wherein the at least one coupling point comprises a raised portion that extends into a bottom of the unit of cargo.

16. The method for positioning and securing cargo of claim 1, further comprising:
    coupling a set of latches into a plurality of slots in a top portion of the first rail such that the first coupling link is unable to move.

17. The method for positioning and securing cargo of claim 1, further comprising:
    positioning and securing the floor beam on a train or ground vehicle.

18. The method for positioning and securing cargo of claim 1, further comprising:
    positioning and securing the floor beam within a warehouse.

19. The method for positioning and securing cargo of claim 1, further comprising:
    removing, by a vehicle, the first coupling link from the first rail and the second coupling link from the second rail; and
    removing, using the vehicle, the unit of cargo from the floor beam.

20. The method for positioning and securing cargo of claim 1, wherein coupling the first coupling link to the inner side of the first rail such that the first coupling link is configured to move along the length of the first rail and the second coupling link to the inner side of the second rail such that the second coupling link is configured to move along the length of the second rail comprises:
    coupling one or more wheels on the first coupling link on top of the first rail; and
    coupling one or more wheels on the second coupling link on top of the second rail.

* * * * *